(12) United States Patent
Dowe et al.

(10) Patent No.: US 8,574,697 B2
(45) Date of Patent: Nov. 5, 2013

(54) USE OF A POLYAMIDE MOLDING COMPOUND FOR LINING CONDUITS

(75) Inventors: Andreas Dowe, Borken (DE); Ralf Tuellmann, Herten (DE); Reinhard Beuth, Marl (DE); Franz-Erich Baumann, Duelmen (DE)

(73) Assignee: Evonik Degussa GmbH, Essen (DE)

( * ) Notice: Subject to any disclaimer, the term of this patent is extended or adjusted under 35 U.S.C. 154(b) by 0 days.

(21) Appl. No.: 12/676,752

(22) PCT Filed: Sep. 30, 2008

(86) PCT No.: PCT/EP2008/063050
§ 371 (c)(1),
(2), (4) Date: Mar. 5, 2010

(87) PCT Pub. No.: WO2009/050031
PCT Pub. Date: Apr. 23, 2009

(65) Prior Publication Data
US 2010/0300573 A1 Dec. 2, 2010

(30) Foreign Application Priority Data

Oct. 17, 2007 (DE) .......................... 10 2007 050 011
May 9, 2008 (DE) .......................... 10 2008 001 678

(51) Int. Cl.
*B29D 22/00* (2006.01)
*F16L 11/00* (2006.01)

(52) U.S. Cl.
USPC ....... 428/36.91; 428/36.9; 138/125; 138/145; 138/147

(58) Field of Classification Search
USPC ............... 138/125, 145, 147; 428/36.9, 36.91
See application file for complete search history.

(56) References Cited

U.S. PATENT DOCUMENTS

| | | | |
|---|---|---|---|
| 3,856,905 A | | 12/1974 | Dawson |
| 5,454,419 A | * | 10/1995 | Vloedman .................... 166/277 |
| 6,677,015 B2 | | 1/2004 | Himmelmann et al. |
| 6,884,485 B2 | | 4/2005 | Baumann et al. |
| 7,005,481 B1 | * | 2/2006 | Lehmann et al. ............. 525/433 |
| 7,582,342 B2 | | 9/2009 | Baumann et al. |
| 2005/0038201 A1 | * | 2/2005 | Wursche et al. ............... 525/340 |
| 2005/0048239 A1 | * | 3/2005 | Mestemacher ............ 428/36.91 |
| 2006/0182916 A1 | * | 8/2006 | Dowe et al. .................. 428/36.9 |
| 2006/0183869 A1 | * | 8/2006 | Dowe et al. ................... 525/340 |
| 2007/0036998 A1 | * | 2/2007 | Dowe et al. ................. 428/474.4 |
| 2010/0009106 A1 | * | 1/2010 | Dowe et al. ................ 428/36.91 |
| 2010/0300572 A1 | * | 12/2010 | Dowe et al. .................. 138/140 |
| 2012/0006465 A1 | | 1/2012 | Dowe et al. |

FOREIGN PATENT DOCUMENTS

DE 10 2006 038108 2/2008
EP 0 266 951 5/1988

OTHER PUBLICATIONS

Palmer, R.J. and Updated by Staff 2005. Polyamides, Plastics. Kirk-Othmer Encyclopedia of Chemical Technology.*
U.S. Appl. No. 13/063,134, filed Mar. 9, 2011, Dowe, et al.
U.S. Appl. No. 13/128,297, filed May 9, 2011, Dowe, et al.
U.S. Appl. No. 13/202,338, filed Aug. 19, 2011, Dowe, et al.
U.S. Appl. No. 13/502,767, filed Apr. 23, 2012, Hartmann, et al.
U.S. Appl. No. 13/457,634, filed Apr. 27, 2012, Goering, et al.
U.S. Appl. No. 13/463,061, filed May 3, 2012, Goering, et al.
U.S. Appl. No. 13/640,552, filed Oct. 11, 2012, Kuhmann, et al.
U.S. Appl. No. 13/639,765, filed Oct. 5, 2012, Kuhmann, et al.
U.S. Appl. No. 13/640,679, filed Oct. 11, 2012, Kuhmann, et al.
U.S. Appl. No. 13/640,586, filed Oct. 11, 2012, Kuhmann, et al.
U.S. Appl. No. 13/729,280, filed Dec. 28, 2012, Pawlik, et al.

* cited by examiner

*Primary Examiner* — Michael L Leonard
(74) *Attorney, Agent, or Firm* — Oblon, Spivak, McClelland, Maier & Neustadt, L.L.P.

(57) ABSTRACT

In a method for the introduction of an inliner into a pipe or a pipeline, where the external diameter of the inliner is greater than the internal diameter of the pipe or of the pipeline, and where the action of an external force is used to reduce the cross section of the inliner prior to the introduction, the inliner is composed of a polyamide moulding composition which comprises at least 50% by weight of polyamide which is not PA11. The recovery behavior of said polyamides is similar to that of polyethylene usually used for this purpose.

17 Claims, No Drawings

USE OF A POLYAMIDE MOLDING COMPOUND FOR LINING CONDUITS

The invention relates to the use of an inliner composed of a polyamide moulding composition which is specified in some detail, for pipes, pipelines, or sewers, where the pipelines or sewers serve for the transport of district heating, fresh water, waste water, oil, gas or similar fluids.

District heating lines, fresh water lines, waste water lines, oil lines or gas lines or lines transporting other fluids, or sewers, have a limited operating time. Lines laid long ago are therefore often defective, thus permitting, for example, escape of waste water into the surrounding ground water or ingress of any ground water present into the waste-water pipes. The reason for this is firstly progressive corrosion damage, and secondly increasing mechanical load due to traffic vibration, or pressure or earth movements associated with civil-engineering work or in the vicinity of mining activities. The depth to which the pipes or sewers in question are buried in the ground is about 1 m or more, and therefore considerable cost would be incurred if the entire length of the pipes or sewers were to be replaced. There is therefore a need for renovation methods which can provide low-cost renovation of defective lines in supply networks and in waste-disposal networks.

The lines under consideration are moreover often equipped with an inliner, sometimes fitted before they leave the factory. This serves inter alia to prevent corrosion damage. By way of example, lines for the transport of crude oil are provided with an inliner before they leave the factory, then being installed by way of example on the ocean bed, or underground or else above ground.

The predominant inliners of the prior art, composed of polyethylene, have a number of disadvantages. By way of example, their swelling behaviour and diffusion behaviour is poor, particularly when organic liquids are conveyed, e.g. crude oil or petrochemicals, or waste water comprising organic liquids, e.g. solvents. Diffusion behaviour is also disadvantageous in gas lines. Polyethylene is moreover susceptible to stress cracking, e.g. on contact with surfactants, and is also notch-sensitive. Because polyethylene has a low softening point and low solvent resistance, inliners composed of this material can be used only up to operating temperatures of at most 65° C.

Inliners composed of nylon-11 (PA11) have been used for some time in the offshore sector in steel pipes used to convey crude oil or untreated gas (J. Mason, Oil & Gas Journal, Oct. 18, 1999, pp. 76-82). The external diameter of the pipe inliner here is designed to be somewhat greater than that of the pipe to be lined. For introduction of the inliner, its cross section is then reduced by stretching, compression or folding. Once the inliner has been introduced, it recovers and thus makes contact with the inner wall of the pipe. This method can be promoted by applying pressure and heat. The resultant lined pipe has no annular space. Swagelining™ and Rolldown may be mentioned as an example of a method known to the person skilled in the art. This method can also be used to introduce the inliner before the pipe leaves the factory. These methods are nowadays standard for introducing polyethylene inliners into pipes.

The German Patent Application No. 10 2006 038 108.4 discloses a pipeline inliner composed of a polyamide moulding composition.

Introduction of the appropriate inliners particularly by the Rolldown method is restricted by the recovery behaviour of the PA11 moulding compositions currently available. The reason for this is that, because the PA11 moulding compositions exhibit very rapid recovery, when the PA11 inliner is introduced into the pipe, its diameter having been reduced by compression, it makes contact too rapidly with the inner wall of the pipe to be lined, making it difficult or impossible to draw the inliner fully into the pipe. This problem can be overcome by introducing the appropriate inliners only into very short sections of pipe. However, this has to be considered uneconomic, since the use of short pipe sections leads to an increased number of connection points. The resultant costs and additional potential defects are not acceptable.

Another way of evading these difficulties consists in dimensioning the inliner in such a way that its pressure exerted on the inner wall of the main pipe after recovery is zero or only minimal. (Y. Giacomelli & B. Howard, 4th MERL Oilfield Engineering with Polymers Conference 2003, Qualification of Plastic Lined Pipelines For Hydrocarbon Transport). In the extreme case the design actually provides a minimal annular gap. However, the result of this is non-ideal fixing of the inliner in the pipe and possible occurrence of subsequent problems such as shifting.

The object of the present invention consisted in eliminating these disadvantages and proving a polyamide moulding composition which is intended for the production of an inliner for pipelines and which firstly possesses the good properties of the polyamide-based materials usually used and secondly can also be introduced into a pipe via reduction of cross section through stretching, compression or folding, without the difficulties described above.

Surprisingly, it has been found that the recovery behaviour of polyamide moulding compositions based on a polyamide which is not PA11 differs so greatly from that of moulding compositions based on PA11 that they can be provided for use as inliners described above.

The invention accordingly provides a method for the introduction of an inliner into a pipe or a pipeline, where the external diameter of the inliner is slightly greater than the internal diameter of the pipe or of the pipeline, and where the action of an external force is used to reduce the cross section of the inliner prior to introduction, where the inliner is composed of a polyamide moulding composition which comprises at least 50% by weight, at least 60% by weight, at least 70% by weight, or at least 80% by weight, of polyamide which is not PA11.

"Pipe" here means in the relatively narrow sense a transportable section; a plurality of such pipes are joined to give a pipeline.

Because the inliner is overdimensioned with respect to the pipe or the pipeline, the recovery of the inliner after insertion guarantees long lasting close fit.

The difference between the diameters according to the claims is at least an infinitesimally small amount. The external diameter of the inliner is typically at most 10%, and preferably at most 6%, greater than the internal diameter of the pipe or of the pipeline.

Suitable methods for the introduction of an overdimensioned inliner into a pipe or a pipeline are described by way of example in the following patent applications: EP-A-0 562 706, EP-A-0 619 451, WO 95/27168, WO 98/02293, WO 01/16520, EP-A-0 377 486, EP-A-0 450 975, EP-A-0 514 142 and WO 96/37725.

The amount by which the cross section of the inliner is generally reduced during stretching, compression or folding is at least 3%, preferably at least 4%, particularly preferably at least 5%, with particular preference at least 6% and very particularly preferably at least 7%.

An example of a suitable introduction method is Swagelining™. In this, inliner pipes are butt welded to give a section which is somewhat longer than the section to be renovated of the carrier pipe, and the inliner section is then drawn through a swage, which temporarily reduces the diameter of the pipe. This allows the inliner to be drawn into the smaller interior of the carrier pipe. Once all of the inliner has been drawn into the carrier pipe, the tensile force is removed. The inliner then attempts to revert to its initial diameter, until it is in firm contact with the inner wall of the carrier pipe. By virtue of the firm contact of the inliner, the through-flow capacity of the renovated pipeline is very close to that before renovation.

Another suitable introduction method is the Rolldown® method. Here again, inliner pipes are first bonded on site by the butt welding method. To permit insertion, the cross section of the inliner is reduced in the Rolldown machine with the aid of rollers arranged in pairs. The speed of the shaping method is typically from one to three metres per minute. After insertion, the pipe ends can be sealed and the inliner can be subjected to water pressure. This can additionally promote recovery to the original diameter of the inliner, which enters into close contact with the inner wall of the pipe. The tensile forces required here during the insertion of the inliner are smaller in comparison with Swagelining, the result being less load on the material and higher insertion speeds.

The folding method is described by way of example in EP-A-0 377 486.

Suitable polyamides are all polyamides other than PA11, and also copolyamides which contain at least 40% by weight of units that derive from w-aminoundecanoic acid. Polyamides particularly suitable for the purposes of the invention are those that derive from one or more of the following monomers:
a) a lactam or the corresponding co-aminocarboxylic acid having 6, 7, 8, 9, 10 or 12 carbon atoms, or else
b) a substantially equimolar mixture composed of a diamine having from 4 to 22 carbon atoms and of a dicarboxylic acid having from 6 to 22 carbon atoms.

Examples of suitable diamines are tetramethylenediamine, pentamethylenediamine, hexamethylenediamine, octamethylenediamine, nonamethylenediamine, 2-methyl-1,5-diaminopentane, 2,2,4- or 2,4,4-trimethylhexamethylenediamine, decamethylene-diamine, dodecamethylenediamine, 4,4'-diaminodicyclohexylmethane, 3,3'-dimethyl-4,4'-diaminodicyclohexylmethane, 4,4'-diaminodicyclohexylpropane, 1,4-diamino-cyclohexane, 1,4-bis(aminomethyl)cyclohexane, 2,6-bis(aminomethyl)norbornane, 3-aminomethyl-3,5,5-trimethylcyclohexylamine, 1,13-diaminotridecane, 1,14-diamino-tetradecane, 1,16-diaminohexadecane and 1,18-diaminooctadecane. It is also possible to use mixtures of various diamines.

Examples of suitable dicarboxylic acids are adipic acid, 2,2,4- or 2,4,4-trimethyladipic acid, azelaic acid, suberic acid, 1,9-nonanedioic acid, 1,10-decanedioic acid, 1,11-undecanedioic acid, 1,12-dodecanedioic acid, 1,13-tridecanedioic acid, 1,14-tetradecanedioic acid, 1,16-hexadecanedioic acid, 1,18-octadecanedioic acid, cyclohexane-1,4-dicarboxylic acid, 4,4'-dicarboxydicyclohexylmethane, 1,4-bis(carboxy-methyl)cyclohexane, terephthalic acid, isophthalic acid and naphthalene-2,6-dicarboxylic acid. It is also possible to use mixtures of various dicarboxylic acids.

The polyamide can moreover contain branching units that derive by way of example from tricarboxylic acids, or from triamines, or from polyethyleneimine.

The polyamide can also be a polyetheresteramide or a polyetheramide. Polyetheresteramides are disclosed, for example, in DE-A-25 23 991 and DE-A-27 12 987; they contain a polyetherdiol as comonomer. Polyetheramides are disclosed, for example, in DE-A-30 06 961; they contain a polyetherdiamine as comonomer.

The polyether unit in the polyetherdiol or in the polyetherdiamine can by way of example be based on 1,2-ethanediol, 1,2-propanediol, 1,3-propanediol, 1,4-butanediol or 1,3-butanediol. The polyether unit can also be of mixed structure, for example having random or blockwise distribution of the units deriving from the diols. The weight-average molar mass of the polyetherdiols or polyetherdiamines is from 200 to 5000 g/mol and preferably from 400 to 3000 g/mol; their content in the polyether-esteramide or polyetheramide is preferably from 4 to 60% by weight and particularly preferably from 10 to 50% by weight. Suitable polyetherdiamines are obtainable via conversion of the corresponding polyetherdiols through reductive amination or coupling to acrylonitrile with subsequent hydrogenation; they are commercially available, for example, in the form of JEFFAMINE® D grades from Huntsman Corp. or in the form of polyetheramine D products from BASF SE.

Examples of suitable polyamides for the purposes of the invention are PA6, PA66, PA610, PA612, PA613, PA88, PA810, PA812, PA1010, PA1012, PA1014, PA12, PA1212, and also materials based thereon which are polyetheresteramides or which are polyetheramides.

It is equally possible to use mixtures of various polyamides, with the precondition of adequate compatibility. Compatible polyamide combinations are known to the person skilled in the art; the combination PA12/PA1012, PA12/PA1212, PA612/PA12, PA613/PA12, PA1014/PA12, and PA610/PA12 may be listed here by way of example. In the event of doubt, compatible combinations can be determined through routine experimentation.

In one preferred embodiment of the invention, a mixture of from 30 to 99% by weight, preferably from 40 to 98% by weight and particularly preferably from 50 to 96% by weight, of polyamide in the relatively narrow sense, and also from 1 to 70% by weight, preferably from 2 to 60% by weight and particularly preferably from 4 to 50% by weight, of polyetheresteramide and/or polyetheramide is used. The use of polyetheramides is preferred here on grounds of better hydrolysis resistance.

The presence of the polyetheresteramide or polyetheramide plasticizes the polyamide moulding composition and improves its deformability, without impairment of recovery behaviour. The non-extractability of the polymeric plasticizer is an advantage here in comparison with the use of low-molecular-weight plasticizers, since it eliminates the risk of shrinkage of the liner during service, which can cause loss of frictional contact between the liner and the wall of the carrier pipe.

The polyamide moulding composition can comprise the usual additives. Illustrative examples of these are colorants, flame retardants, stabilizers, fillers, slip improvers, mould-release agents, impact modifiers, plasticizers, crystallization accelerators, antistatic agents, lubricants, and processing aids, and also other polymers conventionally compounded with polyamides.

Examples of these additives are as follows:

Colorants: titanium dioxide, white lead, zinc white, lithopones, antimony white, carbon black, iron oxide black, manganese black, cobalt black, antimony black, lead chromate, minium, zinc yellow, zinc green, cadmium red, cobalt blue, Prussian blue, ultramarine, manganese violet, cadmium yellow, Schweinfurter green, molybdenum orange and molybdenum red, chrome orange and chrome red, iron oxide red, chromium oxide green, strontium yellow, molybdenum blue, chalk, ochre, umber, green earth, burnt sienna, graphite, or soluble organic dyes.

Flame retardants: antimony trioxide, hexabromocyclododecane, tetrachloro- or tetrabromobisphenol and halogenated phosphates, borates, chloroparaffins, and also red phosphorus, and also stannates, melamine cyanurate and its condensates, such as melam, melem, melon, melamine compounds, such as melamine pyro- and polyphosphate, ammonium polyphosphate, aluminium hydroxide, calcium hydroxide, and also organophosphorus compounds which contain no halogens, for example resorcinol diphenyl phosphate or phosphonic esters.

Stabilizers: metal salts, in particular copper salts and molybdenum salts, and also copper complexes, phosphites, sterically hindered phenols, secondary amines, UV absorbers and HALS stabilizers.

Fillers: glass fibres, glass beads, ground glass fibre, kieselguhr, talc, kaolin, clay, $CaF_2$, aluminium oxides, and also carbon fibres.

Slip improvers and lubricants: $MoS_2$, paraffins, fatty alcohols, fatty acid amides, and also stearates of di- or trivalent metals.

Mould-release agents and processing aids: waxes (montanates), montanic acid waxes, montanic ester waxes, polysiloxanes, polyvinyl alcohol, $SiO_2$, calcium silicates, and also perfluoropolyethers.

Impact modifiers: polybutadiene, EPM, EPDM, HDPE, acrylate rubber.

Antistatic agents: carbon black, carbon fibres, graphite fibrils, polyhydric alcohols, fatty acid esters, amines, amides, quaternary ammonium salts.

Other polymers: ABS, polypropylene.

These additives can be used in the conventional amounts known to the person skilled in the art.

In one preferred embodiment, the polyamide moulding composition comprises from 1 to 25% by weight of plasticizer, particularly preferably from 2 to 18% by weight, and with particular preference from 3 to 15% by weight.

Plasticizers and their use in polyamides are known. A general overview of plasticizers suitable for polyamides can be found in Gächter/Müller, Kunststoffadditive [Plastics additives], C. Hanser Verlag, 2nd edition, page 296.

Examples of conventional compounds suitable as plasticizers are esters of p-hydroxybenzoic acid having from 2 to 20 carbon atoms in the alcohol component or amides of arylsulphonic acids having from 2 to 12 carbon atoms in the amine component, preferably amides of benzenesulphonic acid.

Plasticizers that can be used are inter alia ethyl p-hydroxybenzoate, octyl p-hydroxybenzoate, isohexadecyl p-hydroxybenzoate, N-n-octyltoluenesulphonamide, N-n-butylbenzenesulphonamide or N2-ethylhexylbenzenesulphonamide.

The inliner is preferably produced by a method in which the polyamide of the moulding composition was condensed to give a higher molecular weight through addition of a compound having at least two carbonate units in a quantitative ratio of from 0.005 to 10% by weight, based on the polyamide, where
a) a starting polyamide moulding composition was provided,
b) a premix of the starting polyamide composition and of the compound having at least two carbonate units was prepared,
c) the premix was, if appropriate, stored and/or transported, and
d) the premix was then processed to give the moulding, and the condensation to give a higher molecular weight took place in this step and not before.

Surprisingly, it has been found that this method of addition during processing gives a significant increase in melt stiffness while at the same time the load on the motor is low. The result is that high throughputs can be achieved during processing, despite high melt viscosity, giving an improvement in the cost-effectiveness of the production process.

The molecular weights $M_n$ of the starting polyamides used here are preferably greater than 5000, particularly greater than 8000. Polyamides used here are those having end groups at least to some extent in the form of amino groups. By way of example, at least 30%, at least 40%, at least 50%, at least 60%, at least 70%, at least 80% or at least 90%, of the end groups take the form of amino end groups. The preparation of polyamides having relatively high amino end group content, using diamines or polyamines as regulator, is prior art. In the present instance, the preparation of the polyamide preferably uses, as regulator, an aliphatic, cycloaliphatic or araliphatic diamine having from 4 to 44 carbon atoms. Examples of suitable diamines are hexamethylenediamine, decamethylenediamine, 2,2,4- or 2,4,4-trimethyl-hexamethylenediamine, dodecamethylenediamine, 1,4-diaminocyclohexane, 1,4- or 1,3-dimethylaminocyclohexane, 4,4'-diaminodicyclohexylmethane, 4,4'-diamino-3,3'-dimethyldicyclohexylmethane, 4,4'-diaminodicyclohexylpropane, isophoronediamine, metaxylylenediamine or paraxylylenediamine.

In another preferred embodiment, a polyamine is used as regulator and at the same time as branching agent during the preparation of the polyamide. Examples of these are diethylenetriamine, 1,5-diamino-3-(β-aminoethyl)pentane, tris(2-aminoethyl)amine, N,N-bis(2-aminoethyl)-N',NV-bis[2-[bis(2-aminoethyl)amino]ethyl]-1,2-ethanediamine, and dendrimers, and also polyethyleneimines, in particular branched polyethyleneimines, these being obtainable via polymerization of aziridines (Houben-Weyl, Methoden der Organischen Chemie [Methods of organic chemistry], volume E20, pages 1482 to 1487, Georg Thieme Verlag Stuttgart, 1987) and they generally have the following amino group distribution:
from 25 to 46% of primary amino groups,
from 30 to 45% of secondary amino groups and
from 16 to 40% of tertiary amino groups.

The process of the invention uses at least one compound having at least two carbonate units in a quantitative proportion of from 0.005 to 10% by weight, calculated as a ratio to the polyamide used. This ratio is preferably in the range from 0.01 to 5.0% by weight, particularly preferably in the range from 0.05 to 3% by weight. The term "carbonate" here mean esters of carbonic acid, in particular with phenols or with alcohols.

The compound having at least two carbonate units can be of low molecular weight, or oligomeric or polymeric. It can be composed entirely of carbonate units, or it can also have other units. These are preferably oligo- or polyamide units, oligo- or polyester units, oligo- or polyether units, oligo- or polyetheresteramide units or oligo- or polyetheramide units. These compounds can be prepared via known oligo- or polymerization methods or via polymer-analogous reactions.

In one preferred embodiment, the compound having at least two carbonate units is a polycarbonate, for example one based on bisphenol A, or is a block copolymer comprising this type of polycarbonate block.

When the form in which the compound used as additive, having at least two carbonate units, is metered into the material is that of a masterbatch, metering of the additive can be more precise, since the amounts used are larger. It has moreover been found that use of a masterbatch achieves improved extrudate quality. The masterbatch preferably comprises, as matrix material, the polyamide which is also condensed to give a higher molecular weight in the method of the invention, or a polyamide compatible therewith, but under the reaction conditions it is also possible for incompatible polyamides to undergo some degree of linkage to the polyamide which is to be condensed to give a higher molecular weight, and this brings about compatibilization. The molecular weight $M_n$ of the polyamide used as matrix material in the masterbatch is preferably greater than 5000 and in particular greater than 8000. Polyamides that can be used here are those whose end groups mainly take the form of carboxylic acid groups. By way of example, at least 80%, at least 90% or at least 95%, of the end groups take the form of acid groups.

The concentration of the compound having at least two carbonate units in the masterbatch is preferably from 0.15 to 50% by weight, particularly preferably from 0.2 to 25% by weight and with particular preference from 0.3 to 15% by weight. This masterbatch is prepared in the conventional manner known to the person skilled in the art.

Suitable compounds having at least two carbonate units, and also suitable masterbatches, are described in WO 00/66650, expressly incorporated herein by way of reference.

An additive based on this principle for molecular weight adjustment in polyamides is marketed as Brüggolen M1251 by Brüggemann KG. Primary applications are found in the field of viscosity adjustment for recycled material composed of PA6 or PA66, recycled into extrusion moulding compositions. The additive Brüggolen M1251 is a masterbatch of a low-viscosity polycarbonate, such as Lexan 141, in an acid-terminated PA6. The cause of the molecular weight increase is a reaction between the polycarbonate and the amino end groups present in the material to be condensed to give an increase in molecular weight.

The effectiveness of the method is demonstrated in WO 00/66650 by taking the example of condensing PA6 and PA66 to give an increase in molecular weight, and some of the corresponding polycondensates are used in pure form, but some of them also comprise additives.

The invention is applicable to polyamides which as a result of their preparation comprise at least 5 ppm of phosphorus in the form of an acidic compound. In this instance, from 0.001 to 10% by weight, based on the polyamide, of a salt of a weak acid is added to the polyamide moulding composition prior to compounding or during compounding. DE-A 103 37 707 discloses suitable salts, and is expressly incorporated herein by way of reference.

However, the invention is just as effective when applied to polyamides which, as a result of their preparation, comprise less than 5 ppm of phosphorus, or no phosphorus at all, in the form of an acidic compound. In this instance it is possible, but not essential, to add an appropriate salt of a weak acid.

According to the invention, the compound having at least two carbonate units is added as it stands or in the form of a masterbatch only after compounding, but not later than during processing. It is preferable that during processing the polyamide to be condensed to give an increase in molecular weight or the polyamide moulding composition to be condensed to give an increase in molecular weight is mixed in the form of pellets with pellets of the compound having at least two carbonate units or with the corresponding masterbatch. However, it is also possible to prepare a mixture of pellets of the finished compounded polyamide moulding composition with the compound having at least two carbonate units or with the masterbatch, and then transport or store the material, and then process it. It is naturally also possible to carry out the corresponding procedure using powder mixtures. The decisive factor is that the mixture is not melted until processing has begun. Thorough mixing of the melt during processing is advisable. However, in an equally effective method, the masterbatch can also be metered in the form of a melt stream with the aid of an ancillary extruder into the melt of the polyamide moulding composition to be processed, and then can also be incorporated by thorough mixing.

The method for the production of the inliner is described in general form in EP 1 690 889 A1 and EP 1 690 890 A1.

The wall of the inliner can either be a single-layer wall, in this instance being composed entirely of the polyamide moulding composition, or can be a multilayer wall, where the polyamide moulding composition can form the external layer, the internal layer and/or the middle layer. The other layer(s) is/are composed of moulding compositions based on other polymers, for example polyethylene, polypropylene or fluoropolymers. These multilayer structures can be produced according to the prior art, inter alia by coextrusion.

In one preferred embodiment, the inliner has been rendered antielectrostatic, so that static charge produced through friction with the transported fluid can be dissipated. In the simplest case, this involves an electrically conductive strip arranged either axially or helically, and composed of metal or composed of a conductive moulding composition. It is better to provide a plurality of such strips with preferably regular mutual separation, an example being two, three, four, five, six, seven, eight, nine, ten, eleven or twelve strips. As an alternative to this, one layer of the inliner, preferably the innermost layer, is composed of an electrically conductive moulding composition. The conductivity is produced through addition of metal fibres, carbon fibres, metallized carbon fibres, graphite fibres and preferably conductive carbon black and/or graphite fibrils. Here again, it is preferable that a polyamide moulding composition is involved which comprises at least 50% of polyamide which is not PA11.

The pipeline in question can be a transport line, a distribution line or a service line, and of either pressure-line design or of open-channel design. It serves by way of example for the transport of district heating, fresh water, waste water, gas, oils, such as crude oil, light oil or heavy oil, fuels, such as kerosene or diesel, petrochemicals, brine, lyes, or abrasive fluids or dusts, and can by way of example be a supply line or a waste-disposal line. It has preferably been laid in the ground, in tunnels or trenches, or in water, or else under certain circumstances above ground.

For the purposes of the invention, the pipe can be provided with the inliner either before it leaves the factory or during laying, in order to prolong operating times in service. However, in most instances the inliner is introduced subsequently into the pipeline for its renovation; the term relining is used here.

The internal diameter of the pipelines in question is generally up to 2000 mm, preferably up to 1000 mm and particularly preferably up to 500 mm.

The invention also provides a pipeline comprising this type of inliner.

Use of the invention can achieve very long-lived renovation or sealing of a pipeline.

The method of the invention will be illustrated by way of example below. The examples used the following materials:
Amine-regulated PA12 having 50 meq/kg of $NH_2$ groups and 9 meq/kg of COOH groups, $\eta_{rel}$ about 2.15.

Acid-regulated PA12 having 8 meq/kg of $NH_2$ groups and 50 meq/kg of COOH groups, $\eta_{rel}$ about 2.15.

Brüggolen® M1251, a mixture of a low-viscosity polycarbonate and an acid-terminated PA6.

Ceasit® PC calcium stearate.

PA12 VESTAMID® 2140, a commercially available extrusion grade of PA12 from the applicant.

PA1010 a homopolyamide prepared from 1,10-decanediamine and sebacic acid by a known method and having a relative solution viscosity $\eta_{rel}$ of 2.1, determined to DIN EN ISO 307.

HDPE a commercially available pipe extrusion grade.

PA11 a commercially available grade from Arkema (RILSAN®BESNO).

The following blends were first prepared in the melt, and extruded and pelletized:

|  | Batch 1 | Batch 2 |
| --- | --- | --- |
| Amine-regulated PA12 [% by weight] | 99.9 | 0 |
| Acid-regulated PA12 [% by weight] | 0 | 98.4 |
| Bruggolen M1251 [% by weight] | 0 | 1.5 |
| Ceasit PC [% by weight] | 0.1 | 0.1 |
| Throughput [kg/h] | 10 | 10 |
| Screw rotation rate [1/min] | 250 | 250 |
| Melt temperature [° C.] | 249 | 251 |
| $\eta_{rel}$ to DIN EN ISO 307 | 2.10 | 2.12 |

A high-molecular-weight grade designated "PA12/Brüggolen" of PA12 was prepared, extruded, and pelletized in a Reifenhäuser 50 single-screw extruder with three-zone screw (L=25 D) in accordance with the following mixing specification:

|  | PA12/Brüggolen |
| --- | --- |
| Batch 1 [% by weight] | 60 |
| Batch 2 [% by weight] | 40 |
| Melt temperature [° C.] | 250 |

Compounded materials were produced from the polyamides in accordance with Table 1:

TABLE 1

Production of compounded materials

|  | Comparative example 1 | Inventive example 1 | Inventive example 2 | Inventive example 3 |
| --- | --- | --- | --- | --- |
| PA11 | 87.5 |  |  |  |
| PA12 |  | 87.5 |  |  |
| PA12/Brüggolen |  |  | 87.5 |  |
| PA 1010 |  |  |  | 87.5 |
| Plasticizer | 12 | 12 | 12 | 12 |
| Stabilizer | 0.5 | 0.5 | 0.5 | 0.5 |
| Solution viscosity $\eta_{rel}$ to DIN EN ISO 307 | 2.1 | 2.1 | 2.5 | 2.1 |

Recovery behaviour of the corresponding moulding compositions was determined by a compression test followed by recording of recovery behaviour. The test specimens were prepared from injection-moulded plaques of dimensions 110×150×6 mm, by milling. The resultant test specimens of dimensions 10×10×6 mm were then subjected to a compression test with subsequent measurement of recovery over 24 hours.

The test specimens were first compressed by 20, 25 and 30% of the original specimen thickness. Once the target compression had been reached, the force was reduced to zero and the extent of recovery was recorded continuously over 250 seconds. Specimen thickness was then again measured after 1 hour and after 24 hours.

TABLE 2

Test results for 20% compression

| Residual compression in % | Comparison 1 | Comparison 2 (HDPE) | Inventive example 1 | Inventive example 2 | Inventive example 3 |
| --- | --- | --- | --- | --- | --- |
| After 250 sec | 2.8 | 8.3 | 5.2 | 5.8 | 5.4 |
| After 1 h | 2.4 | 5.8 | 5.0 | 5.3 | 5.1 |
| After 24 h | 2.0 | 4.8 | 4.8 | 4.8 | 4.7 |

TABLE 3

Test results for 25% compression

| Residual compression in % | Comparison 1 | Comparison 2 (HDPE) | Inventive example 1 | Inventive example 2 | Inventive example 3 |
| --- | --- | --- | --- | --- | --- |
| After 250 sec | 4.5 | 11.2 | 7.7 | 8.5 | 8.1 |
| After 1 h | 4.1 | 10.5 | 7.3 | 7.9 | 7.7 |
| After 24 h | 3.4 | 7.5 | 7.1 | 7.1 | 7.2 |

TABLE 4

Test results for 30% compression

| Residual compression in % | Comparison 1 | Comparison 2 (HDPE) | Inventive example 1 | Inventive example 2 | Inventive example 3 |
| --- | --- | --- | --- | --- | --- |
| After 250 sec | 6.2 | 14.1 | 10.2 | 11.5 | 11.2 |
| After 1 h | 5.6 | 12.2 | 9.7 | 10.2 | 10.0 |
| After 24 h | 4.9 | 10.5 | 9.3 | 9.7 | 9.5 |

Comparison of the results shows that the recovery behaviour of the polyamide moulding compositions tested, based on PA12 and PA1010 was markedly slower than that of a comparable PA11 moulding composition. Indeed the recovery behaviour was found to be very similar to that of polyethylene. Analogous results were obtained with PA1212, PA613, PA1014, PA610, PA1012 and PA612.

The invention claimed is:

1. A method comprising introducing an inliner into a pipe or a pipeline, wherein an external diameter of the inliner is greater than an internal diameter of the pipe or of the pipeline; an external force reduces a cross section of the inliner prior to the introduction; and the inliner comprises a polyamide moulding composition which comprises at least 50% by weight of polyamide selected from the group consisting of PA610, PA612, PA613, PA1010, PA1012, PA1014, PA12, PA1212 and materials based thereon which are polyetheresteramides or which are polyetheramides.

2. The method according to claim 1, wherein the cross section of the inliner is reduced by at least 3%.

3. The method according to a claim 1, wherein
the polyamide of the polyamide moulding composition comprises from 1 to 70% by weight of at least one of polyetheresteramide and polyetheramide.

4. The method according to claim 1, wherein
the polyamide moulding composition comprises from 1 to 25% by weight of plasticizer.

5. The method according to claim 1, comprising
producing the inliner by a method comprising condensing the polyamide of the moulding composition to have a higher molecular weight through addition of a compound having at least two carbonate units in a quantitative ratio of from 0.005 to 10% by weight, based on the polyamide, wherein
a) a starting polyamide moulding composition is provided,
b) a premix of the starting polyamide composition and of the compound having at least two carbonate units is prepared,
c) the premix is, optionally stored, and
d) the premix is then processed to give the moulding, and the condensation to give a higher molecular weight is carried out.

6. A pipeline which comprises an inliner introduced by the method according to claim 1.

7. A transport comprising a pipeline according to claim 6.

8. The method according to claim 1, wherein the external diameter of said inliner is at most 10% of said internal diameter of said pipe or of said pipeline.

9. The method according to claim 1, wherein the cross section of the inliner is reduced by at least 4%.

10. The method according to claim 1, wherein the cross section of the inliner is reduced by at least 5%.

11. The method according to claim 1, wherein the cross section of the inliner is reduced by at least 6%.

12. The method according to claim 1, wherein the cross section of the inliner is reduced by at least 7%.

13. The method according to claim 1, wherein the said polyamide moulding composition comprises at least 60% by weight of said polyamide.

14. The method according to claim 1, wherein the said polyamide moulding composition comprises at least 70% by weight of said polyamide.

15. The method according to claim 1, wherein the said polyamide moulding composition comprises at least 80% by weight of said polyamide.

16. The method according to claim 5, wherein the said compound having at least two carbonate units is used in a quantitative ratio of from 0.01 to 5.0 wt. %.

17. The method according to claim 5, wherein the said compound having at least two carbonate units is used in a quantitative ratio of from 0.05 to 3 wt. %.

* * * * *